United States Patent [19]

Brocx et al.

[11] Patent Number: 5,322,217
[45] Date of Patent: Jun. 21, 1994

[54] VEHICLE HEATING SYSTEM AND BYPASS THEREFOR

[75] Inventors: Robert L. Brocx, Auburn; Donald L. Bucey, Cle Elum, both of Wash.

[73] Assignee: Red Dot Corporation, Seattle, Wash.

[21] Appl. No.: 875,447

[22] Filed: Apr. 29, 1992

[51] Int. Cl.5 ............................................. B60H 1/02
[52] U.S. Cl. .................. 237/12.3 B; 137/117
[58] Field of Search ............. 237/12.3 R, 12.3 B, 237/12.3 C, 2 A; 137/117, 115, 500, 505, 503, 505.18

[56] References Cited

U.S. PATENT DOCUMENTS

| | | | |
|---|---|---|---|
| 2,087,613 | 7/1937 | Bordeaux | 237/12.3 |
| 2,345,140 | 3/1944 | McCollum et al. | 237/12.3 |
| 3,302,696 | 2/1967 | Rogers | 165/37 |
| 3,727,879 | 4/1973 | Lange et al. | 251/84 |
| 3,966,119 | 6/1976 | Harter et al. | 237/12.3 |
| 3,966,164 | 12/1960 | Britton | 137/73 |
| 3,981,279 | 9/1976 | Bubniak et al. | 123/41.14 |
| 4,373,666 | 2/1983 | Williams | 237/12.3 B |
| 4,391,407 | 7/1983 | Nakazawa | 237/12.3 |
| 4,865,249 | 9/1989 | Sugano et al. | 236/92 |
| 5,048,752 | 9/1991 | Hintennach et al. | 237/12.3 B |

Primary Examiner—Henry A. Bennet
Attorney, Agent, or Firm—Joan H. Pauly

[57] ABSTRACT

A heater circuit in a vehicle engine cooling and passenger compartment heating system comprises a control valve (26), and a supply line (22) and a return line (24) both of which are separate from the radiator circuit of the system. A bypass passageway (48) extends between the supply line (22) upstream of the valve (26) and the return line (24) downstream of the valve (26). A bypass valve normally closes the passageway (48) and opens in response to a pressure differential between the supply line (22) and return line (24) exceeding a predetermined magnitude. The passageway (48) has first and second detachably connected portions that communicate with the supply and return lines (22, 24) via radial openings (44, 46). A spring (72) abuts a shoulder (54) in the second portion and a valve element (62) that seats against a flat surface surrounding the radial opening (44) in the supply line (22). The element (62) has laterally extending guide teeth (68) and a rear reduced diameter lug (70) engaged by the spring (72). The bypass valve limits strain on the control valve, makes manual operation of the control valve easier, and enhances the consistency of control of the outlet temperature of the heater.

7 Claims, 5 Drawing Sheets

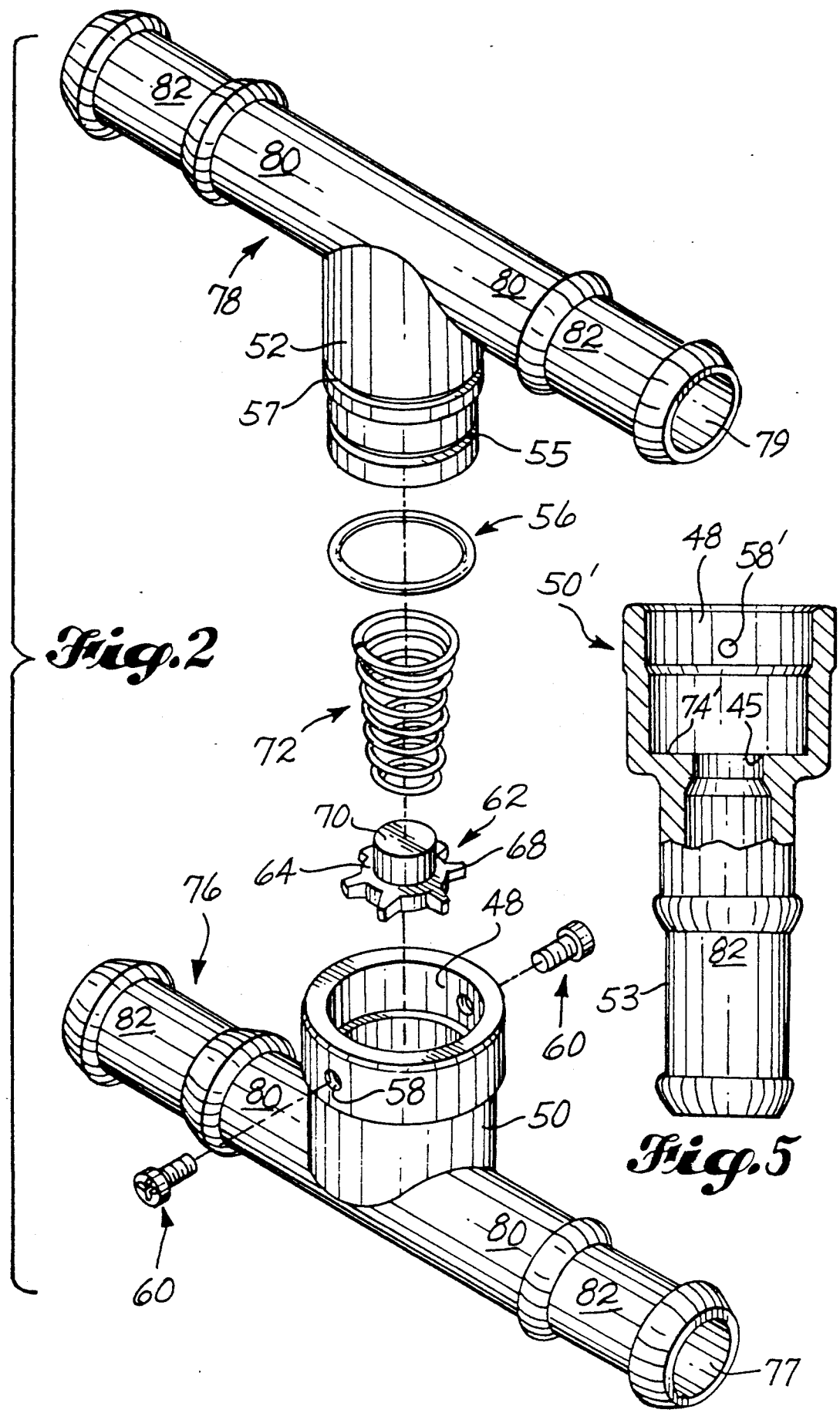

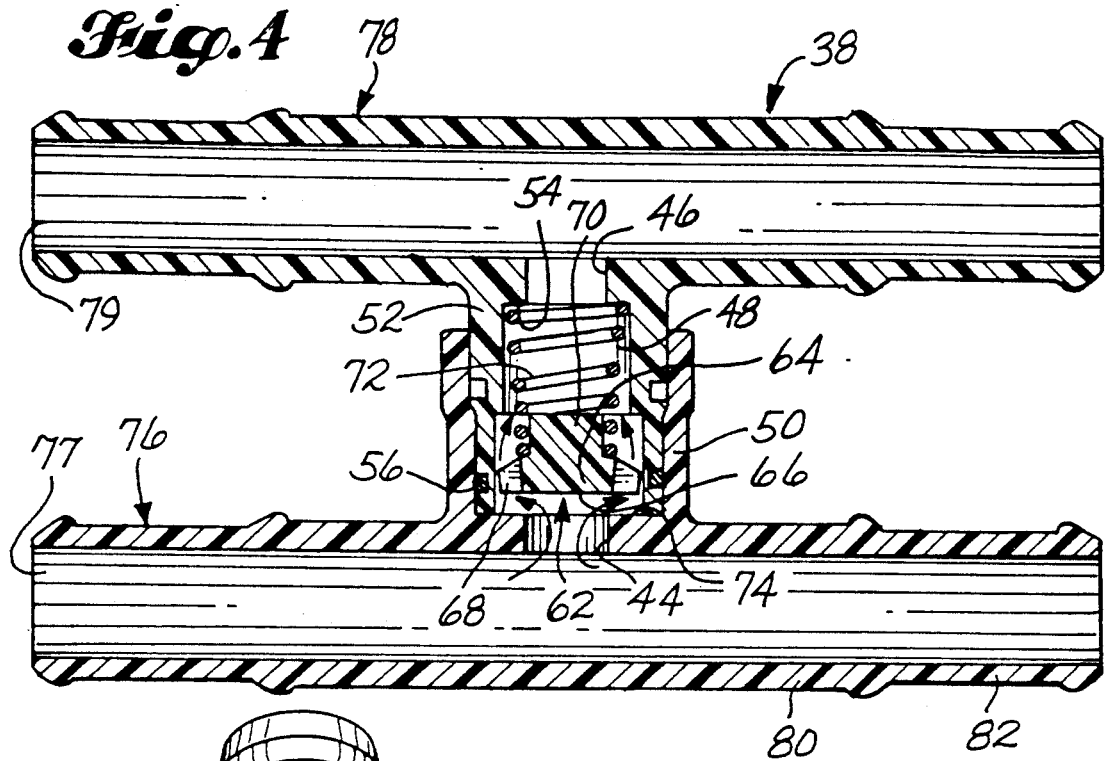
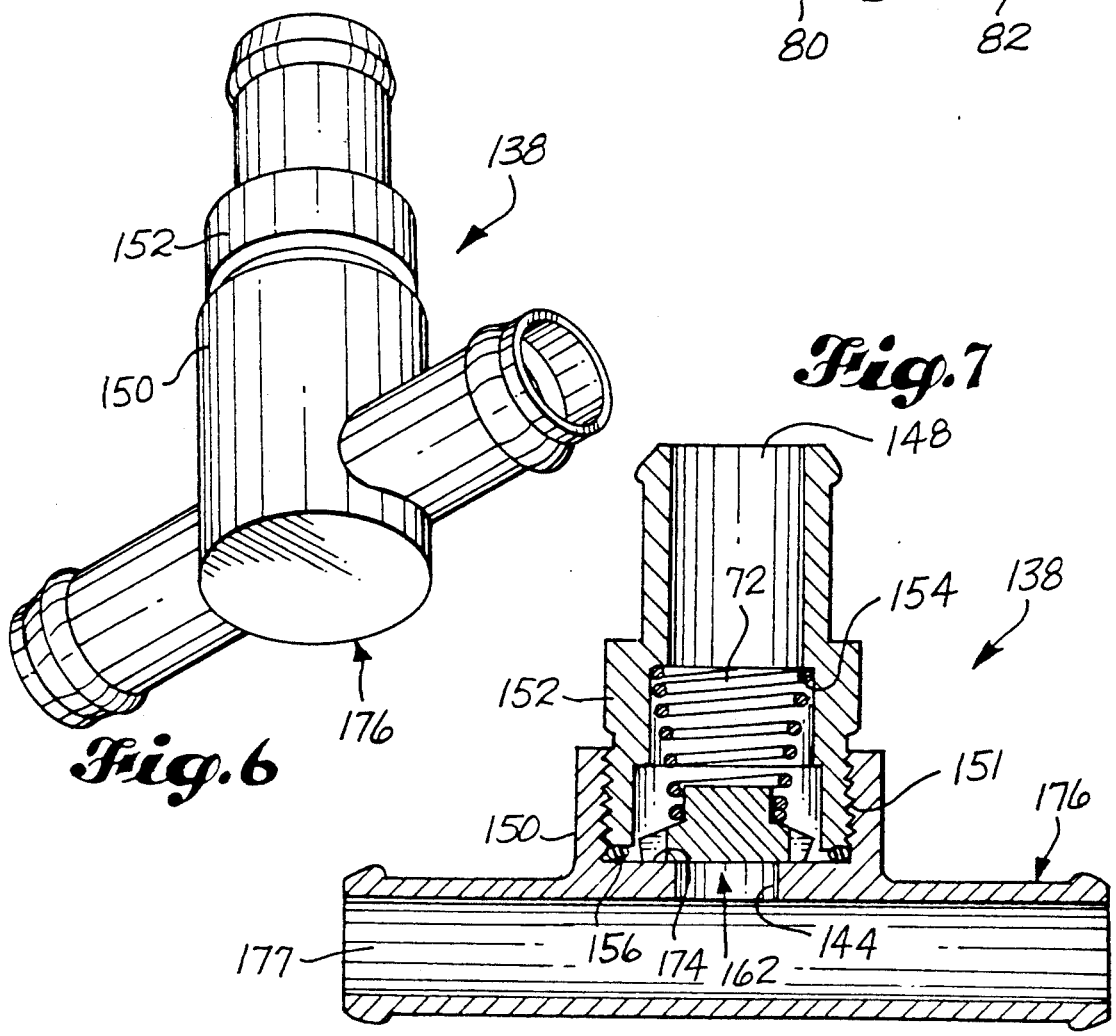

5,322,217

VEHICLE HEATING SYSTEM AND BYPASS THEREFOR

TECHNICAL FIELD

This invention relates to fluid circuits and, more particularly, to a bypass passageway and a bypass valve therein that limits the pressure differential across a control valve, such as a manually operated control valve of a vehicle passenger compartment heating system.

BACKGROUND INFORMATION

The most common type of system for heating the passenger compartments (cabs) of heavy duty vehicles is a system that directs hot engine coolant through a heater core and controls the interior temperature of the compartment by controlling the flow of the coolant. Typically, the temperature control is accomplished by manually moving a lever accessible to an occupant of the compartment. Movement of the lever adjusts a flow control valve to thereby adjust the flow of coolant. There is a non-linear relationship between the rate of flow and the air outlet temperature. This makes it difficult to adjust the temperature by means of a lever whose position varies linearly with the flow rate. To overcome this difficulty and enable the operator of the lever to more easily and accurately adjust the temperature, flow control valves have been developed that modulate the coolant flow in a non-linear way to achieve a linear relationship between the hand-operated lever and the air output temperature. One example of such a valve is the valve disclosed in U.S. Pat. No. 3,727,879, granted Apr. 17, 1973, to P. J. Lange et al. This type of valve has been in use in heavy duty vehicle passenger compartment heating systems for a number of years. FIG. 11 illustrates the non-linear relationship between the control lever position and coolant flow typical of the valve. FIG. 12 illustrates the linear relationship between the lever position and the air outlet temperature. Nearly half of the air temperature control is achieved by controlling the first half gallon per minute of coolant flow.

The valve described in the Lange et al. patent is capable of providing the desired lever position to air output temperature relationship illustrated in FIG. 12 when the coolant temperature, delivery flow rate, and pressure are constant. Unfortunately, the actual operation of heavy duty vehicles produces conditions that depart from the ideal condition of a constant value for each of these three parameters. Coolant temperature, flow rate, and delivery pressure vary as the engine load and engine rpm vary. The thermostat in the engine's cooling system limits the variation in temperature. The flow rate and delivery pressure are a function of the engine rpm and the setting of the heating system control valve. When the valve lever is positioned to control flow in the first half gallon range, changes in engine rpm can result in unacceptable variations in flow rate.

In addition to the difficulty in maintaining the desired temperature control during certain operating conditions, other problems have been encountered in connection with the use of the type of control valve discussed above. When the vehicle's engine is operated at continuously high rpm's, such as during prolonged driving at high speeds, a high pressure differential is placed across the flow control valve if the valve is in its off or a slightly open position. The high pressure differential can make the manual operation of the lever very difficult. The difficulty of operation has been observed, in particular, in connection with heating systems in which the flow control valves are Boden cable operated. This type of operation is very common. The high pressure differential also places severe stress on the valve, and especially its seal and metering components. This stress shortens the operational life of the valve.

DISCLOSURE OF THE INVENTION

A subject of the invention is an improved heater circuit in a vehicle engine cooling and passenger compartment heating system of a type having a supply member, a return member, and a radiator circuit with an inlet end communicating with the supply member and an outlet end communicating with the return member. According to an aspect of the invention, the heater circuit comprises a passenger compartment heater, a supply line communicating the supply member with the heater, and a return line communicating the heater with the return member. Both the supply line and the return line are separate from the radiator circuit. A control valve is positioned to control flow of fluid through the supply line to the heater. A bypass passageway extends between the supply line upstream of the control valve and the return line downstream of the control valve. A bypass valve is positioned in and normally closes the bypass passageway. The bypass valve is openable, in response to a pressure differential between the supply line and the return line exceeding a predetermined magnitude, to permit flow through the bypass passageway from the supply line to the return line.

The heater circuit of the invention may be used in vehicle engine cooling and passenger compartment heating systems with varying characteristics. For example, the form of the supply member and/or the return member may be varied. It is contemplated that the heater circuit of the invention will most commonly be used in connection with systems in which the supply member comprises a supply manifold having a plurality of supply ports, and the return member comprising a return manifold having a plurality of return ports. In this arrangement, the inlet and outlet ends of the radiator circuit are formed by one of the supply ports and one of the return ports, respectively. The supply line and return line communicate with another supply port and another return port, respectively.

The control valve in the heater circuit of the invention may also take various forms. However, it is presently anticipated that the advantages of the combination of features of the heater circuit will be more fully utilized when the control valve of the circuit is hand operated, and especially when the control valve comprises a lever for manual operation thereof and provides a heater outlet temperature that varies substantially linearly with the position of the lever.

In the preferred embodiment of the heater circuit, the supply line and return line each have a radial opening formed therein. The bypass passageway has first and second detachably connected portions that communicate with the supply line and return line, respectively, via these openings. The second portion of the bypass passageway has a shoulder formed thereon. The bypass valve includes a valve element and a biasing spring. The spring has a first end abutting the shoulder and a second end urged against the valve element to bias the valve element into a position in which it closes the opening in the supply line.

Another subject of the invention is a bypass for controlling a pressure differential across a valve in a fluid circuit of a type having a supply line and a return line. The bypass comprises a bypass passageway extending between the supply line upstream of the valve and the return line downstream of the valve. A bypass valve is positioned in and normally closes the bypass passageway. The bypass valve is openable, in response to a pressure differential between the supply line and the return line exceeding a predetermined magnitude, to permit flow through the bypass passageway from the supply line to the return line. The supply line and the return line have radial openings, and the bypass passageway and bypass valve have the structure described above.

In the currently preferred embodiment of the bypass, the supply line has an essentially flat sealing surface surrounding the radial opening therein. The valve element has a center portion with an essentially flat face that seats against the sealing surface. The valve element also has a plurality of spaced guide teeth projecting laterally from its center portion and engaging the sealing surface when the valve element is seated. A rear reduced diameter lug on the element is surrounded by the second end of the spring.

The invention solves the problems discussed above that have been encountered in connection with heavy duty vehicle heating systems. By controlling and limiting the pressure differential across the flow control valve of the system, the invention limits the stress to which the valve is subjected and, thereby, increases the reliability of the valve and lengthens its operational life. The limiting of the pressure differential also limits the resistance of the lever to a change in its position to, in turn, avoid the problem of difficult lever operation under conditions such as continuous operation of the vehicle engine at high rpm's. The invention achieves a maintenance of the pressure differential across the control valve within limits so that operation of the lever that controls the valve results in a more consistent relationship between the air outlet temperature and the lever position. This more consistent relationship enhances the comfort of the occupant of the vehicle passenger compartment. The preferred structure of the bypass passageway and bypass valve of the invention has the advantages of being relatively simple and highly reliable. The structure readily lends itself to both cost effective original manufacture and retrofitting in existing heating systems. The forming of the bypass passageway into two portions makes the assembly of the bypass quick and easy and allows easy maintenance of the bypass valve. The bypass aspect of the invention is highly versatile and may be used in various types of fluid circuits including, but not limited to, vehicle heater circuits.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 2 is an exploded pictorial view of the assembly shown in FIG. 1.

FIG. 4 is like FIG. 3 except that it shows the bypass valve in an open position.

FIG. 5 is an elevational view of an alternative form of one of the components of the assembly shown in FIGS. 1-4, with portions shown in section.

FIG. 6 is a pictorial view of a second preferred embodiment of the assembly.

FIG. 7 is a sectional view of the assembly shown in FIG. 6.

BEST MODES FOR CARRYING OUT THE INVENTION

Figure 8:
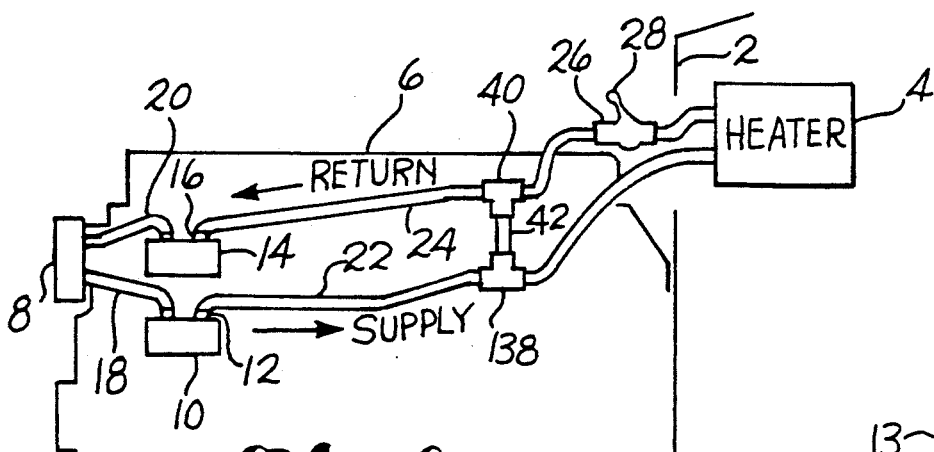
FIG. 8 is a schematic diagram of portions of a vehicle engine cooling and passenger compartment heating system incorporating the heater circuit of the invention.
Figure 9:
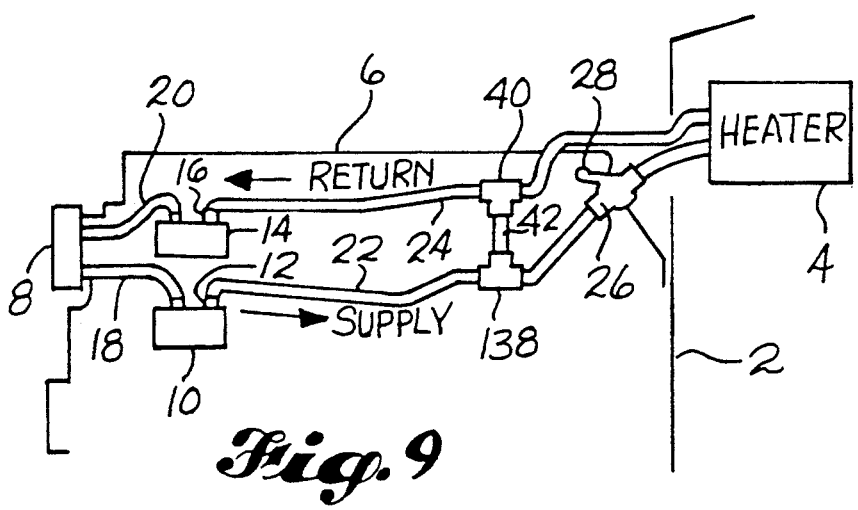
FIG. 9 is like FIG. 8 except that it shows the control valve in a different location.
Figure 10:
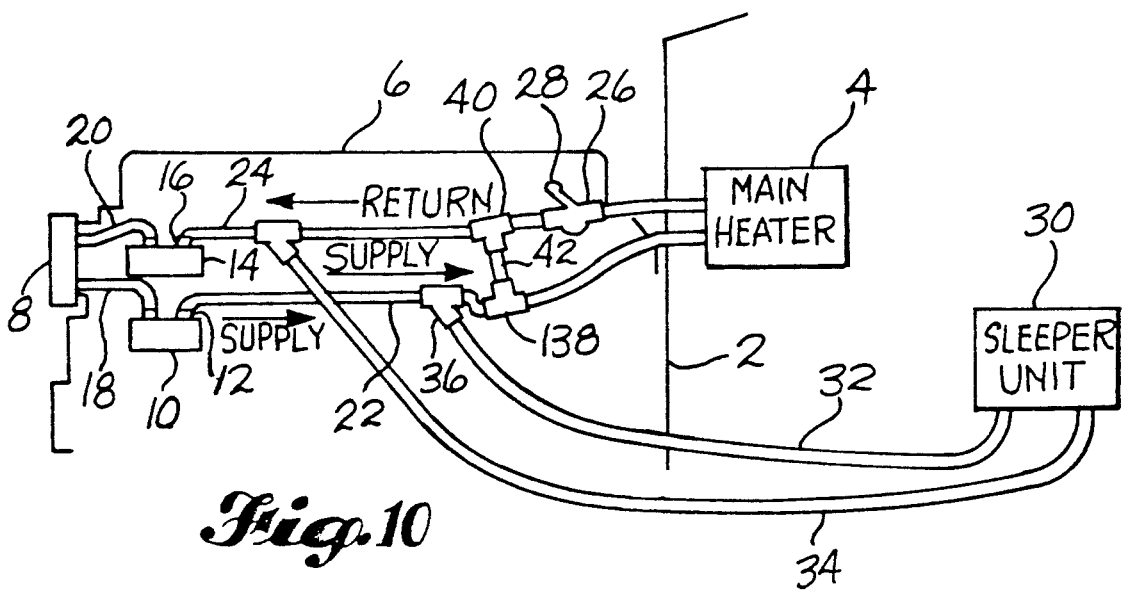
FIG. 10 is like FIG. 8 except that it shows a system that has an auxiliary heater circuit for a sleeper unit.
Figure 11:
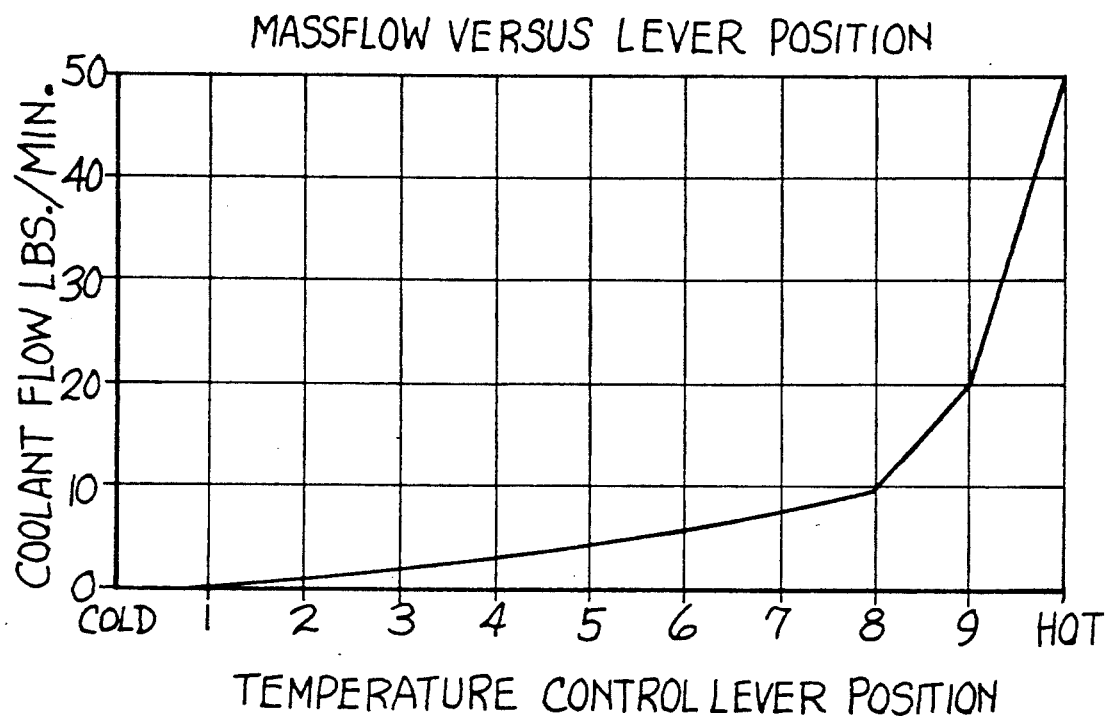
FIG. 11 is a graph of the relationship between the temperature control lever position and coolant flow.
Figure 12:
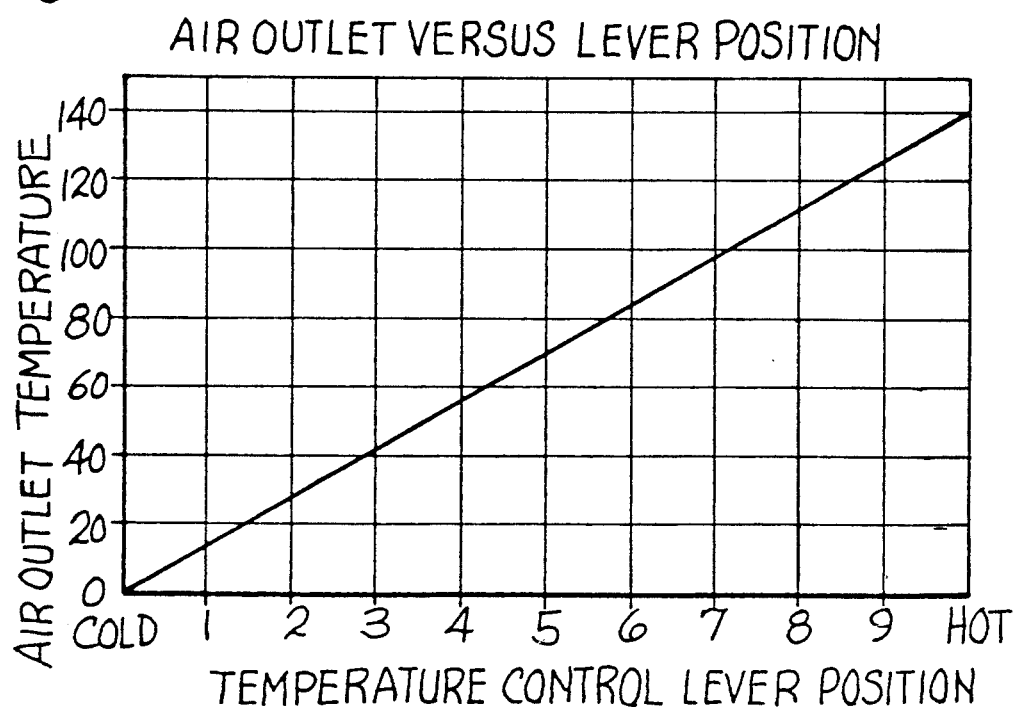
FIG. 12 is a graph of the relationship between the lever position and the air outlet temperature.

The drawings show apparatus that is constructed according to the invention and that constitutes the best modes of the invention currently known to the applicant. As shown in FIGS. 8-10, the apparatus of the invention is incorporated into an engine cooling and passenger compartment heating system of a type that is commonly used in heavy duty vehicles. It is anticipated that the primary use of the invention will be in systems of the type illustrated in FIGS. 8-10. However, it is intended to be understood that the invention may also be used to advantage in other types of vehicle cooling and heating systems, and that the bypass structure of the invention may be used in fluid circuits in various applications including, but not limited to, vehicle cooling and heating systems.

Referring to FIG. 8, the system shown therein is one in which hot engine coolant is directed through a heater core to control the interior temperature of the vehicle cab. In FIG. 8, the reference numeral 2 indicates the usual wall between the engine compartment and the cab. The heater core is located in a heater unit 4 inside the cab. The engine cooling portion of the system is a conventional type in which the engine is cooled by means of a water jacket 6. A supply manifold 10 and a return manifold 14 are carried by the water jacket. Each of these manifolds 10, 14 has a plurality of ports 12, 16. Heat from the engine is dissipated by means of a radiator 8. Hot coolant flows to the radiator 8 through one of the supply ports 12 on the supply manifold 10 through a radiator supply line 18. The return portion of the radiator circuit includes a return line 20 that extends from the radiator 8 to one of the return ports 16 on the return manifold 14. The system also includes additional conventional elements not shown in the drawings, such as a thermostat to control flow to the radiator and a water pump.

Still referring to FIG. 8, the conventional components of the heater circuit include the heater 4, a supply line 22 from the supply manifold 10 to the heater 4, a return line 24 from the heater 4 to the return manifold 14, and a control valve 26. The supply line 22 communicates with the supply manifold 10 via one of the supply ports 12 separate from the supply port which receives the radiator supply line 18. Similarly, the return line 24 communicates with the return manifold 14 via a separate return port 16. The valve 26 controls flow of coolant through the supply line 22 to the heater 4. The valve 26 is lever operated and may be of the type disclosed in U.S. Pat. No. 3,727,879, cited above. The valve lever 28 is connected to a manual lever inside the cab (not shown), such as by a cable. As shown in FIG. 8, the valve 26 is positioned in the heater return line 24. FIG. 9 shows the valve 26 positioned in the supply line 22. In other respects, the systems shown in FIGS. 8 and 9 are identical.

Figure 8A:
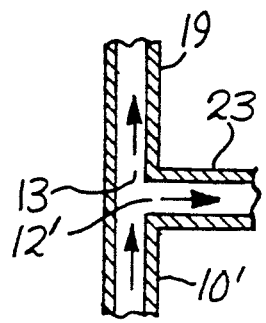
FIG. 8A is a sectional view of an alternate form of the supply manifold.

The manifolds 10, 14 shown in FIGS. 8 and 9 are of a common conventional structure. Each manifold 10, 14 has a housing that forms a chamber, and a plurality of ports communicating with the chamber for receiving fluid therefrom or delivering fluid thereto. As used herein, the term "manifold" has a broad meaning which includes structures other than the usual structure illustrated in FIGS. 8 and 9. FIG. 8A shows an example of an alternative structure. In FIG. 8A, a conduit 10' forms the supply manifold. The conduit 10' has two branches 19, 23, each of which receives a portion of the flow from the main portion of the conduit 10'. As shown, the conduit 19 is an upstream portion of a supply line to the radiator and communicates with the manifold conduit 10' by a port 13 formed by its interface with the conduit 10'. Similarly, the branch 23 forms an upstream portion of a supply line to the heater and communicates with the manifold 10' via a port 12' formed by its interface with the manifold 10'. Within the scope of the invention, the supply manifold could have the structure shown in FIG. 8, that shown in FIG. 8A, or some other similar structure. The structure of the return manifold may also be varied without departing from the scope of the invention.

FIG. 10 illustrates a system that incorporates the elements shown in FIG. 8 and the additional feature of an auxiliary heater circuit. The auxiliary circuit supplies heat to a passenger area of the vehicle separate from the vehicle cab. As shown in FIG. 10, an auxiliary heater 30 is provided for heating the type of sleeper unit sometimes provided behind the cab of a heavy duty truck. The auxiliary heating circuit includes a supply line 32 that receives heated coolant from the main heater circuit supply line 22 via a fitting 36. A return line 34 returns coolant from the auxiliary heater 30 to the heater circuit return line 24 via a similar fitting.

In the type of engine cooling and passenger compartment heating system shown in FIGS. 8-10, the provision of a supply manifold 10 and return manifold 14 and separate supply and return lines to the radiator 8 and heater 4 allows the heater circuit to be controlled independently of the radiator circuit. The bypass apparatus of the invention is a part of the heater circuit and improves the operation of the heater circuit without affecting its independence from the radiator circuit. As shown in FIGS. 8, 9, and 10, the bypass apparatus comprises a bypass passageway extending between the heater, supply line 22 upstream of the control valve 26 and the heater return line 24 downstream of the control valve 26. The functioning of the heater circuit, including the bypass, is the same regardless of whether the control valve 26 is in the supply line 22 or the return line 24. FIGS. 8, 9, and 10 show heater circuits in which the supply and return lines 22, 24 are sufficiently far apart that separate fittings are needed to form the bypass between the supply line 22 and the return line 24. As shown, a T-shaped bypass valve unit 138 is positioned in the supply line, and a T-shaped fitting 40 of a conventional type is positioned in the return line 24. A conduit 42, such as a hose, connects the two fittings 40, 138 to complete the bypass passageway between the two lines 22, 24.

When the supply line 22 is sufficiently close to the return line 24, an H-shaped fitting may be used in place of the two fittings 40, 138 and hose 42 shown in FIGS. 8, 9, and 10. The currently preferred embodiment of such an H-shaped bypass unit 38 is illustrated in FIGS. 1-4. The unit 38 is formed by two components, a T-shaped supply fitting 76 and a similarly shaped return fitting 78. Each of these components 76, 78 is made from molded plastic. The head portion of each of the components 76, 78 has a passageway extending axially therethrough. The passageway 77 extending through the supply component 76 forms a part of the flow passageway of the supply line 22 when the unit 38 is incorporated into the heater circuit. The passageway 79 of the return component 78 forms a part of the return line passageway. Each component head portion has two opposite ends each of which has a first outer diameter portion 80 and a second reduced outer diameter portion 82 formed axially outwardly of the first portion 80. This stepped diameter configuration allows each end of each component 76, 78 to be hooked up to either of two sizes of hose. Thus, a single model of the bypass unit 38 may be easily incorporated into any of a variety of specific types of heater circuits which use either of the two most common hose sizes or a combination of these hose sizes.

The stem portion 50 of the supply component 76 and the stem portion 52 of the return component 78 form first and second portions of the bypass passageway 48. The stem portions 50, 52 are releasably connectable to form the bypass passageway 48. As shown, the return stem portion 52 is received into the supply stem portion 50. An annular groove 55 (FIG. 2) is formed on the outer circumferential surface of the return stem 52 for receiving an O-ring 56 that seals the connection between the two stem portions 50, 52. The connection between the two components is secured by means of a pair of set screws 60 that are received into radial holes 58 in the circumferential wall of the supply stem 50 and a second annular groove 57 formed on the outer circumferential surface of the return stem 52.

The head portion of each component 76, 78 is provided with a radial opening 44, 46 that communicates the respective flow passageway 77, 79 with the bypass passageway 48. A flat surface is formed on each head portion around the outer end of this radial opening 44, 46. The surface 74 around the radial opening 44 that opens onto the supply passageway 77 forms a flat sealing surface 74 against which a valve element seats, as described below. The surface around the radial opening 46 in the return component 78 forms a shoulder 54 that serves as a spring abutment.

Figure 1:
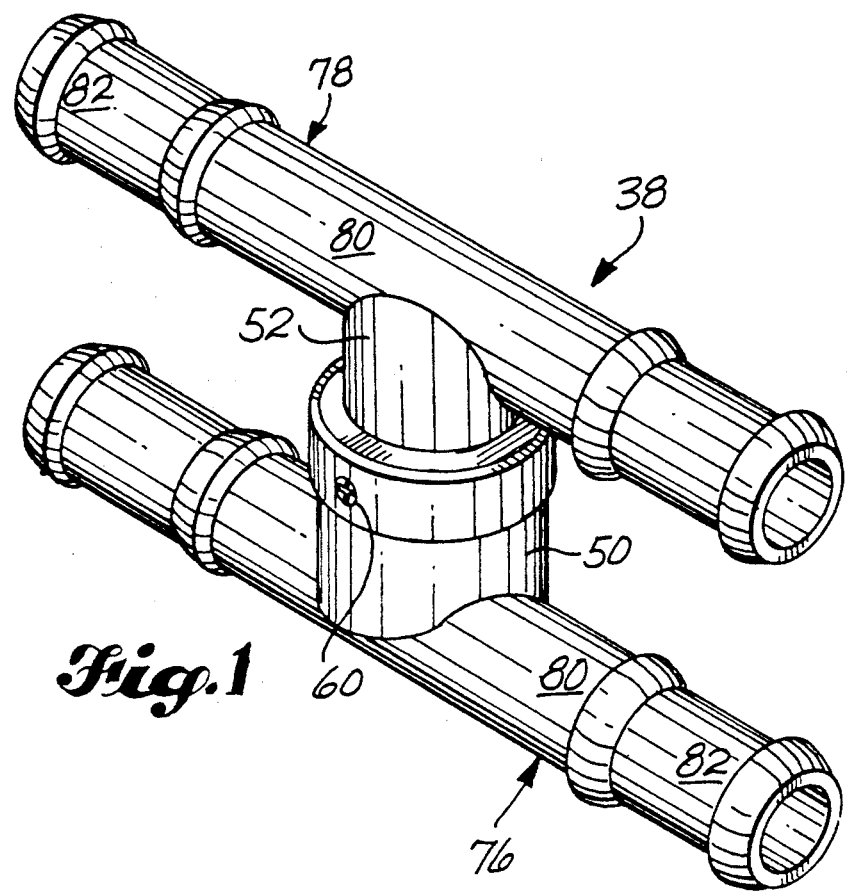
FIG. 1 is a pictorial view of a first preferred embodiment of the bypass assembly of the invention.
Figure 3:
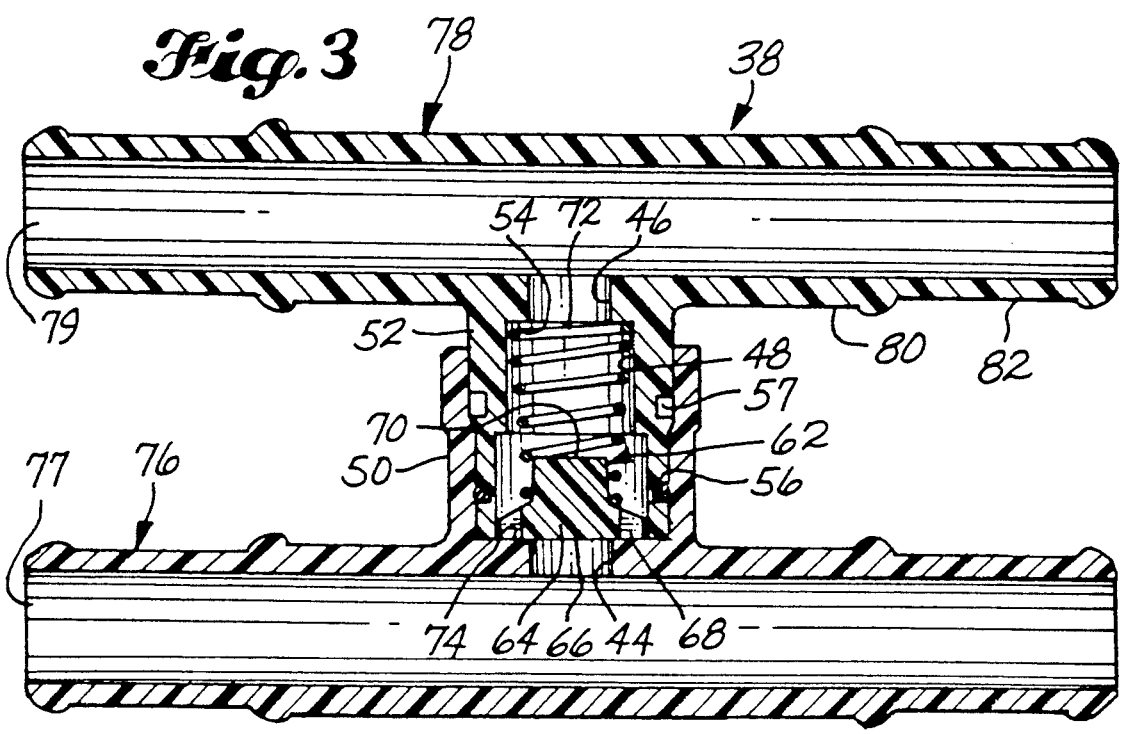
FIG. 3 is a sectional view of the assembly shown in FIG. 1.

A bypass valve is positioned in and normally closes the bypass passageway 48. Referring to FIGS. 2-4, the bypass valve element 62 has a center portion 64 with a flat outer face 66. This flat outer face 66 engages the sealing surface 74 around the radial opening 44 in the supply component 76 to normally close the bypass passageway 48. The rear portion of the valve element opposite the sealing face 66 forms a reduced diameter lug 70. A coil spring 72 has a narrow end which surrounds the lug 70 and abuts the rear surface of the center portion 64 to urge the valve element 72 into its seated position shown in FIG. 3. The opposite end of the spring 72 abuts the spring abutment formed by the shoulder 54.

A plurality of circumferentially spaced, laterally extending teeth 68 project from the center portion 64. In the illustrated embodiment, each tooth 68 projects in a radial direction. The axially outer surfaces of the teeth 68 form an extension of the flat sealing face 66 of the valve element 62 and engage the sealing surface 74 around the radial opening 44 to help support the valve element 62 when it is seated against the surface 74. The teeth 68 also serve to guide axial movement of the valve element 62 when the valve opens, as described below. The teeth 68 and the gaps between adjacent teeth 68 are dimensioned to permit a relatively large flow volume through the bypass passageway 48 upon even a slight opening of the valve element 62, to help maximize protection of the control valve 26. Preferably, each tooth 68 tapers in a radially outward direction and has a circumferential extent at its base about one-half the extent of each gap.

The bypass valve in the bypass passageway 48 serves to limit the pressure differential across the control valve 26. The bypass valve opens in response to a pressure differential between the supply line 22, 77 and the return line 24, 79 exceeding a predetermined magnitude. The spring 72 is calibrated to allow the valve element 62 to move away from its valve seat 74 when the differential exceeds this magnitude. The opening of the valve is illustrated in FIG. 4. As shown therein, the movement of the valve element 62 permits flow of coolant from the supply passageway 77 through the bypass passageway 48 to the return passageway 79. This, in effect, short circuits a portion of the flow in the heater circuit to improve the performance of the circuit and limit the strain on the control valve 26. The positioning of the bypass valve in the heater circuit separate from the radiator circuit ensures that the bypass valve is truly responsive to the pressure differential across the control valve 26. The bypass valve opens when the control valve 26 is closed or in a nearly closed position. When the control valve 26 is more fully opened, the bypass valve closes to allow full flow to the heater 4. Thus, the bypass valve protects the control valve 26 without sacrificing heater performance.

For a situation in which the supply line 22 and return line 24 of the heater circuit are too far apart for use of the H-shaped fitting configuration shown in FIGS. 1–4, either of the components 76, 78 may be replaced by a fitting structured to engage the other component and a hose 42 which in turn is connected to a conventional T-shaped fitting 40, as shown in FIGS. 8–10. The embodiment of the bypass assembly shown in FIGS. 6 and 7 is an example of a structure in which the return portion of the bypass passageway is formed by a linear fitting and the supply component retains a T-shaped configuration.

FIG. 5 illustrates a linear component 50' that may be used in combination with a conventional T-fitting 40 and a hose 42 in place of the supply component 76 shown in FIGS. 1–4. The fitting 50' has a first end with a structure substantially the same as the structure of the stem portion 50 of the component 76 shown in FIGS. 1–4. This first end portion defines a valve chamber portion of the bypass passageway 48 and has two holes 58' for engaging set screws 60. The other opposite end portion 53 of the fitting 50' has a structure essentially the same as the structure of each of the ends of the head portions of the components 76, 78 shown in FIGS. 1–4 for engaging either of two sizes of hose. A reduced diameter portion of the bypass passageway 48 extends through the end portion 53. A flat sealing surface 74' is formed around the interface 45 between the valve chamber and reduced diameter portions of the bypass passageway 48. In use, the fitting 50' is removably connected to the return component 78, which is in turn incorporated into the return line 24 of the heater circuit. The fitting 50' is connected to the supply line 22 by means of a T-fitting 40 and a hose 42. The T-fitting forms a radial opening in the supply line 22. The complete bypass passageway 48 is formed by the stem portion 52 of the return component 78, the fitting 50', the hose 42, and the stem portion of the T-fitting 40.

FIGS. 6 and 7 illustrate the type of bypass unit 138 shown incorporated into a heater circuit in FIGS. 8, 9, and 10. As shown, the unit 138 is made from machined metal components 152, 176. In each of the embodiments of the bypass apparatus illustrated in the drawings, the components may be made from various materials. However, the use of molded plastic is generally preferred because of cost considerations.

Referring to FIGS. 6 and 7, the supply component 176 has a structure similar to the component 76 shown in FIGS. 1–4. The component 176 is T-shaped and has a head portion that forms a supply flow passageway 177. The other component 152 of the assembly 138 has a first end that is releasably connected to the stem portion 150 of the component 176 by means of threads 151. An 0-ring 156 seals the connection between the two components 152, 176. The attached end of the component 152 has a structure similar to the structure of the stem portion 52 of the return component 78 shown in FIGS. 1–4. The opposite end of the component 152 is configured to receive a hose 42. The supply component 176 has a radial opening 144 communicating the supply flow passageway 177 with the bypass passageway 148. A flat sealing surface 174 surrounds the opening 144. A valve element 162 with the same type of structure as the valve element 62 shown in FIGS. 2–4 seats against the sealing surface 174. A spring 72 engages the valve element 162 and a shoulder 154 formed by the component 152 to bias the valve element 162 into its sealing position shown in FIG. 7. The bypass valve formed by the two components 152, 176, valve element 162, and spring 72 operates in the same manner as the valve shown in FIGS. 2–4 to limit the pressure differential across the control valve 26.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. In a vehicle engine cooling and passenger compartment heating system of a type having a supply member, a return member, and a radiator circuit with an inlet end communicating with said supply member and an outlet end communicating with said return member, an improved heater circuit comprising:

a passenger compartment heater;

a supply line, separate from said radiator circuit, communicating said supply member with said heater;

a return line, separate from said radiator circuit, communicating said heater with said return member;

a control valve positioned to control flow of fluid through said supply line to said heater and to control air outlet temperature of said heater;

a bypass passageway extending between said supply line upstream of said control valve and said return line downstream of said control valve; and a bypass valve positioned in and normally closing said bypass passageway; said bypass valve being openable, in response to a pressure differential between said supply line and said return line exceeding a predetermined magnitude, to permit flow through said bypass passageway from said supply line to said return line and thereby limit a corresponding pressure differential across said control valve.

2. In a vehicle engine cooling and passenger compartment heating system of a type having a supply member, a return member, and a radiator circuit with an inlet end communicating with said supply member and an outlet end communicating with said return member, an improved heater circuit comprising:

a passenger compartment heater;

a supply line, separate from said radiator circuit, communicating said supply member with said heater;

a return line, separate from said radiator circuit, communicating said heater with said return member;

a control valve positioned to control flow of fluid through said supply line to said heater and to control air outlet temperature of said heater;

a bypass passageway extending between said supply line upstream of said control valve and said return line downstream of said control valve; and a bypass valve positioned in and normally closing said bypass passageway; said bypass valve being openable, in response to a pressure differential between said supply line and said return line exceeding a predetermined magnitude, to permit flow through said bypass passageway from said supply line to said return line and thereby limit a corresponding pressure differential across said control valve;

in which said supply member comprises a supply manifold having a plurality of supply ports; and said return member comprises a return manifold having a plurality of return ports; said inlet and outlet ends of said radiator circuit being formed by one of said supply ports and one of said return ports, respectively, and said supply line and said return line communicating with another of said supply ports and another of said return ports, respectively.

3. The heater circuit of claim 1, in which said control valve is hand operated.

4. The heater circuit of claim 1, in which said control valve comprise a lever for manual operation thereof; and said control valve provides a heater outlet temperature that varies substantially linearly with the position of said lever.

5. In a vehicle engine cooling and passenger compartment heating system of a type having a supply member, a return member, and a radiator circuit with an inlet end communicating with said supply member and an outlet end communicating with said return member, an improved heater circuit comprising:

a passenger compartment heater;

a supply line, separate from said radiator circuit, communicating said supply member with said heater;

a return line, separate from said radiator circuit, communicating said heater with said return member;

a control valve positioned to control flow of fluid through said supply line to said heater;

a bypass passageway extending between said supply line upstream of said control valve and said return line downstream of said control valve; and a bypass valve positioned in and normally closing said bypass passageway; said bypass valve being openable, in response to a pressure differential between said supply line and said return line exceeding a predetermined magnitude, to permit flow through said bypass passageway from said supply line to said return line;

in which each of said supply line and said return line has a radial opening formed therein; said bypass passageway has first and second detachably connected portions that communicate with said supply line and said return line, respectively, via said openings; said second portion has a shoulder formed thereon; and said bypass valve includes a valve element, and a biasing spring having a first end abutting said shoulder, and a second end urged against said valve element to bias said valve element into a position in which it closes said opening in said supply line.

6. A bypass for controlling a pressure differential across a flow valve in a fluid circuit of a type having a supply line and a return line, comprising:

a bypass passageway extending between said supply line upstream of said valve and said return line downstream of said valve; and a bypass valve positioned in and normally closing said bypassing passageway; said bypass valve being openable, in response to a pressure differential between said supply line and said return line exceeding a predetermined magnitude, to permit flow through said bypass passageway from said supply line to said return line and thereby limit a corresponding pressure differential across said flow valve;

wherein each of said supply line and said return line has a radial opening formed therein; said bypass passageway has first and second detachably connected portions that communicate with said supply line and said return line, respectively, via said openings; said second portion has a shoulder formed thereon; and said bypass valve includes a valve element, and a biasing spring having a first end abutting said shoulder, and a second end urged against said valve element to bias said valve element into a position in which it closes said opening in said supply line.

7. A bypass for controlling a pressure differential across a valve in a fluid circuit of a type having a supply line and a return line, comprising:

a bypass passageway extending between said supply line upstream of said valve and said return line downstream of said valve; and a bypass valve positioned in and normally closing said bypass passageway; said bypass valve being openable, in response to a pressure differential between said supply line and said return line exceeding a predetermined magnitude, to permit flow through said bypass passageway from said supply line to said return line;

wherein each of said supply line and said return line has a radial opening formed therein; said bypass passageway has first and second detachably connected portions that communicate with said supply line and said return line, respectively, via said openings; said second portion has a shoulder formed thereon; and said bypass valve includes a valve element, and a biasing spring having a first end abutting said shoulder, and a second end urged against said valve element to bias said valve element into a position in which it closes said opening in said supply line; and wherein said supply line has an essentially flat sealing surface surrounding said radial opening in said supply line; and said valve element has a center portion with an essentially flat face that seats against said surface, a plurality of spaced guide teeth projecting laterally from said center portion and engaging said surface when said valve element is seated, and a rear reduced diameter lug surrounded by said second end of said spring.

* * * * *

UNITED STATES PATENT AND TRADEMARK OFFICE
CERTIFICATE OF CORRECTION

PATENT NO.   :   5,322,217
DATED        :   June 21, 1994
INVENTOR(S)  :   Robert L. Brocx et al.

It is certified that error appears in the above-identified patent and that said Letters Patent is hereby corrected as shown below:

On the cover, ITEM [56], "References Cited, U.S. PATENT
    DOCUMENTS", "3,966,164 . . . Britton" should be
    -- 2,966,164 . . . Britton --.
Claim 2, column 9, line 47, "respectively, " should be
    -- respectively; --
Claim 4, col. 9, line 54, "comprise" should be -- comprises --.
Claim 6, column 10, line 32, "bypassing" should be -- bypass --.

Signed and Sealed this

Sixth Day of September, 1994

Attest:

BRUCE LEHMAN

Attesting Officer     Commissioner of Patents and Trademarks